H. TENNEY.
FRUIT FUNNEL DEVICE.
APPLICATION FILED OCT. 24, 1914.
1,186,148.
Patented June 6, 1916.
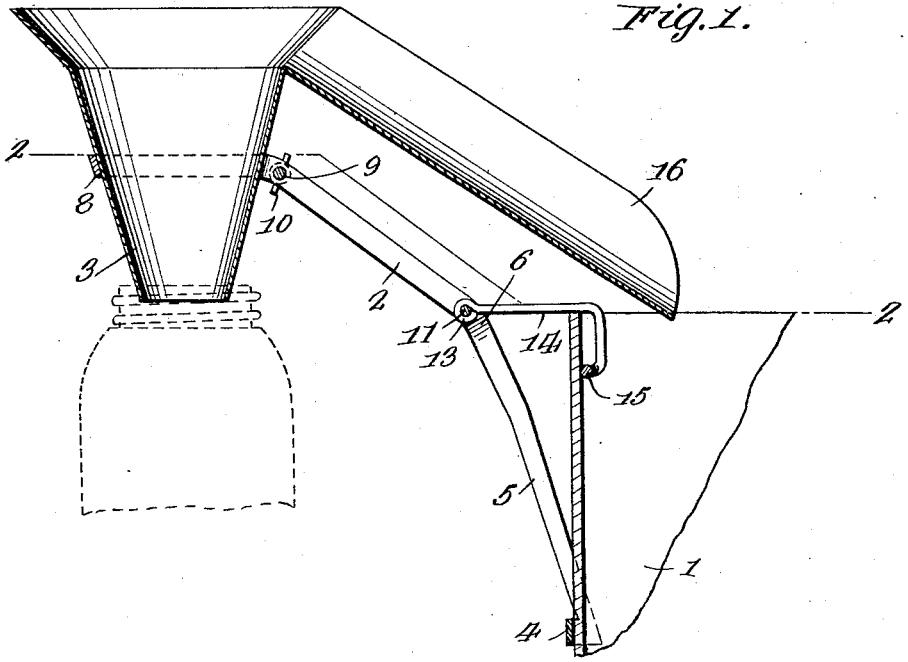
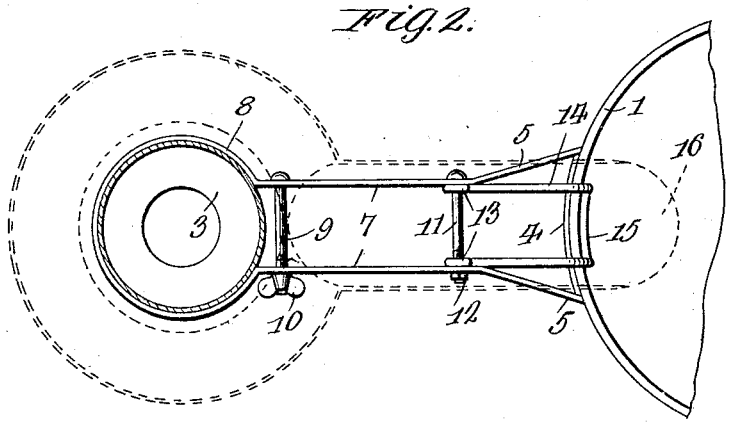

UNITED STATES PATENT OFFICE.

HILLEARY TENNEY, OF ALTON, WEST VIRGINIA.

FRUIT-FUNNEL DEVICE.

1,186,148.  Specification of Letters Patent.  Patented June 6, 1916.

Application filed October 24, 1914. Serial No. 868,501.

*To all whom it may concern:*

Be it known that I, HILLEARY TENNEY, a citizen of the United States, residing at Alton, in the county of Upshur and State of West Virginia, have invented certain new and useful Improvements in Fruit-Funnel Devices, of which the following is a specification.

My invention relates to fruit funnel devices.

It is a well known fact that in preserving fruit considerable difficulty is occasioned in removing the fruit from the kettle or other container and placing it in the jar for preserving purposes. In previous devices of this character the juice from the berries falls upon the table and stains the same and at the same time causes a considerable waste of fruit.

It is the primary object of my invention to overcome these objectionable features by providing a novel fruit funnel device detachably associated with the kettle or other container comprising novel means for supporting the funnel device, the latter having a novel guiding means extending therefrom for receiving the berries and juice and preventing the same from dropping or spilling on the table, the guiding means being so arranged to convey the spilled juice and fruit into the kettle.

Another object of my invention resides in the construction of the supporting means, the latter having novel means associated therewith for facilitating a substantial rigid connection with the fruit container.

A further object of my invention resides in the provision of the novel means for receiving the funnel, the receiving means having means associated therewith for removably clamping the funnel in position.

A still further object of my invention resides in the construction and arrangement of the funnel and guiding means associated with the support.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings: Figure 1 is a side elevational view of my invention applied to a portion of a kettle or other container, and Fig. 2 is a top plan view of my invention taken on the line 2—2 of Fig. 1.

Referring more particularly to the drawings in which similar reference numerals designate like or corresponding parts throughout the different views, I provide a kettle or other fruit container 1, the latter having detachably associated therewith a supporting means 2 for the fruit funnel 3. The improved supporting means in this instance consists essentially of a supporting frame formed preferably from a single piece of strap metal, the inner end 4 of which is bent into a configuration to conform substantially to the contour of the kettle 1 and has the supporting arms 5 continuing upwardly therefrom at a substantially acute angle to the side of the kettle, the arms being arranged in convergent relation with each other to a point 6, substantially in the plane of the upper edge of the kettle 1, and from this point the arms extend at a substantially acute angle to the convergent portions and arranged in parallel relation with each other as shown at 7 for a purpose to be hereinafter described. The free end of the frame 2 continuing immediately from the parallelly arranged portions 7 is bent into a substantially circular formation to provide a funnel receiving support 8, the latter being arranged in a substantially conical form so as to frictionally engage the sides of the funnel 3. In order to detachably hold the funnel in a substantially rigid position with respect to the support 8, I have extended a bolt 9 through the parallel arranged portions of the arms 7 at a point adjacent the support 8 and for removable engagement upon the screw threaded projecting end of the bolt and set screw or like adjusting element 10. For the purpose of detachably securing the support in the frame 2 to the kettle 1, I have extended a bolt or like fastening element 11 through the opposite ends of the parallel arranged portions 7 adjacent the bend 6, the bolt being secured therein by means of a nut 12. Pivotally mounted about the bolt and positioned between the arms are the looped ends 13 of a supporting hook 14, the latter being substantially U-shaped in configuration and having the arms thereof bent at substantially right angles to the main portions at points adjacent the vertex 15 and which vertex is curved arcuately inward to engage the inner periphery of the kettle and coöperates with the inner end of the supporting frame for establishing a substantial rigid connection between the frame and kettle.

The funnel 3 comprises a conical body having the upper end thereof flared and which flared end has formed integrally therewith and extending downwardly therefrom at a substantially right angle a drip trough or spout 16, the latter being substantially semicircular in cross section and has the outer end thereof arranged in substantial alinement with the lower end of the funnel body and disposed within the kettle 1 as clearly shown in the drawings.

The operation of my device is as follows: When it is desired to place fruit in a preserving jar as shown in dotted lines, the supporting frame 2 having the funnel therein is placed in engagement with the kettle 1 and the hook 14 engaged about the inner periphery of the kettle so as to form a substantial rigid connection therewith. The supporting arms 5, as set forth, extend upwardly and outwardly at an angle to the outer periphery of the kettle so as to accommodate the placing of the jar or other receptacle beneath the funnel and between the funnel and the container. When the user is dipping fruit from the kettle, he can direct the course of the dipper, not shown, above the trough 16 and deposit the contents thereof within the funnel whereupon they are guided into the jar. Should any of the contents spill from the dipper they will drip upon the drip trough whereupon they are again returned into the kettle, thus saving a great waste and preventing the same from soiling or otherwise injuring the cloth or like disposed on the table.

Although I have shown and described the preferred embodiment of my invention, I desire to be understood that I am not limited to the exact details shown, however, great stress is laid upon the arrangement of the funnel supporting means for the funnel coöperating therewith for accomplishing the purposes set forth.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. A fruit funnel device including a frame for removably receiving and supporting a drip trough type funnel, and means mounted on the frame for engagement with a container for removably supporting the frame on a container so that the funnel will be disposed to one side of and above the container.

2. A fruit funnel device including a frame for removably receiving and supporting a funnel having a drip trough, and a hook pivotally mounted on the frame for engagement with a container for removably supporting the frame on the container in such a manner that drippings will slide down the trough and return to the container.

3. A fruit funnel device including a frame formed from a single piece of material having one end curved to receive a funnel having a drip trough, means for removably clamping the funnel in the frame, means for removably holding the frame on a container in such a manner that the drip trough will be arranged to receive the drippings and permit of the return of the drippings to the container.

4. A fruit funnel device including a frame removably connected to a container and extending upwardly and rearwardly therefrom, and means for removably clamping a funnel of the drip trough type in the frame so that drippings will slide down the trough into the container.

5. A fruit funnel device including a frame formed from a single piece of metal the outer end of which is bent into a circular formation for receiving and supporting a funnel of the drip trough type, a hook pivotally associated with the frame for removable engagement with a container for supporting the frame laterally of the container, and clamping means associated with the sides of the frame for removably holding the funnel in the frame so that the drip trough is arranged above the container.

6. A fruit funnel device including a frame formed from a single piece of metal having the outer end curved into substantially circular formation and bent so as to support a funnel of the drip trough type therein, the opposite end of the frame being shaped in conformity with and adapted to bear against a container, a hook pivotally mounted between the sides of the frame adapted to removably support the frame so that the funnel will be positioned upwardly and laterally therefrom, and means for removably clamping the funnel in the frame so as to dispose the drip trough above the container and permit the drippings to return thereto.

In testimony whereof I affix my signature in presence of two witnesses.

HILLEARY TENNEY.

Witnesses:
E. M. PRINGLE,
M. B. PRINGLE.

Copies of this patent may be obtained for five cents each, by addressing the "Commissioner of Patents, Washington, D. C."